United States Patent [19]
Tinholt

[11] Patent Number: 5,211,198
[45] Date of Patent: May 18, 1993

[54] POPPET CONSTRUCTION FOR VALVE

[75] Inventor: Thomas Tinholt, Galesburg, Mich.

[73] Assignee: Humphrey Products Company, Kalamazoo, Mich.

[21] Appl. No.: 961,483

[22] Filed: Oct. 15, 1992

[51] Int. Cl.$^5$ .................. F15B 13/044; F16K 11/044
[52] U.S. Cl. ............................ 137/625.27; 137/625.5; 137/625.65; 251/333
[58] Field of Search ........... 137/625.27, 625.5, 625.65; 251/333

[56] References Cited

U.S. PATENT DOCUMENTS 3,510,103  5/1970  Carsello ............................ 251/333
4,842,246  6/1989  Floren et al. ...................... 251/333
4,915,134  4/1990  Toliusis et al. .
4,971,115 11/1990  Tinholt .

Primary Examiner—Gerald A. Michalsky
Attorney, Agent, or Firm—Flynn, Thiel, Boutell & Tanis

[57] ABSTRACT

A poppet-type valve unit having annular elastomeric poppet which cooperates with an annular valve seat. The exterior profile defined by a pair of generally frusto-conical surfaces which are disposed radially inwardly and outwardly with respect to one another. The inner frusto-conical surface extends at a steeper angle or slope relative to valve movement direction than does the outer frusto-conical surface, thereby defining a peak where the two frusto-conical surfaces meet. This peak substantially corresponds in diameter to the diameter of the valve seat. This increases the flow area between the poppet and valve seat when the poppet is opened.

7 Claims, 3 Drawing Sheets

POPPET CONSTRUCTION FOR VALVE

FIELD OF THE INVENTION

This invention relates to a poppet-type valve unit having an improved poppet configuration.

BACKGROUND OF THE INVENTION

Numerous valve units have been developed for controlling flow of liquids and gases, and poppet-type valve units are commonly utilized for this purpose. Such valve units commonly employ a shiftable valve having an annular poppet thereon, which poppet is conventionally of elastomeric construction and cooperates with an annular valve seat provided on the valve unit housing. U.S. Pat. Nos. 4,971,115 and 4,915,134, both owned by the Assignee hereof, illustrate prior four-way and three-way poppet valves which have been developed for controlling fluid flow, and which have been demonstrated to possess desirable constructional and operational features. However, in an ongoing attempt to still further improve upon the performance of such poppet-type valve units, additional improvements have been made in the poppet configuration and constitute the invention hereof.

More specifically, the present invention relates to an improved poppet-type valve unit having an improved poppet configuration so as to provide increased flow capability and/or minimal valve member stroke between open and closed positions, in comparison to prior poppet-type valve units, such as the units of the aforementioned patents.

More specifically, in the improved poppet-type valve unit of the present invention, the annular elastomeric poppet cooperates with an annular valve seat, but the poppet is provided with an exterior profile which enables the flow area between the poppet and valve seat, in the open position, to be maximized in relationship to the stroke of the valve member between open and closed positions, thereby providing for increased flow capability in proportion to valve stroke.

In the improved poppet-type valve unit, as aforesaid, the poppet has an exterior profile defined by a pair of generally frusto-conical surfaces which are disposed radially inwardly and outwardly with respect to one another so that the inner frusto-conical surface terminates in an outer diameter which substantially corresponds with the inner diameter of the outer frusto-conical surface. The inner frusto-conical surface extends at a steeper angle or slope relative to valve movement direction than does the outer frusto-conical surface, thereby defining a peak or corner where the two frusto-conical surfaces meet. This peak substantially corresponds in diameter to the diameter of the valve seat and is substantially contacted by the valve seat when the poppet is sealed against the valve seat. This maximizes the flow area between the poppet and the valve seat when the poppet is opened, and in addition maximizes the amount of elastomeric material disposed in the region contacted by the valve seat to maximize the sealing engagement.

Other objects and purposes of the invention will be apparent to persons familiar with valve units of this general type upon reading the following specification and inspecting the accompanying drawings.

Figure 1:
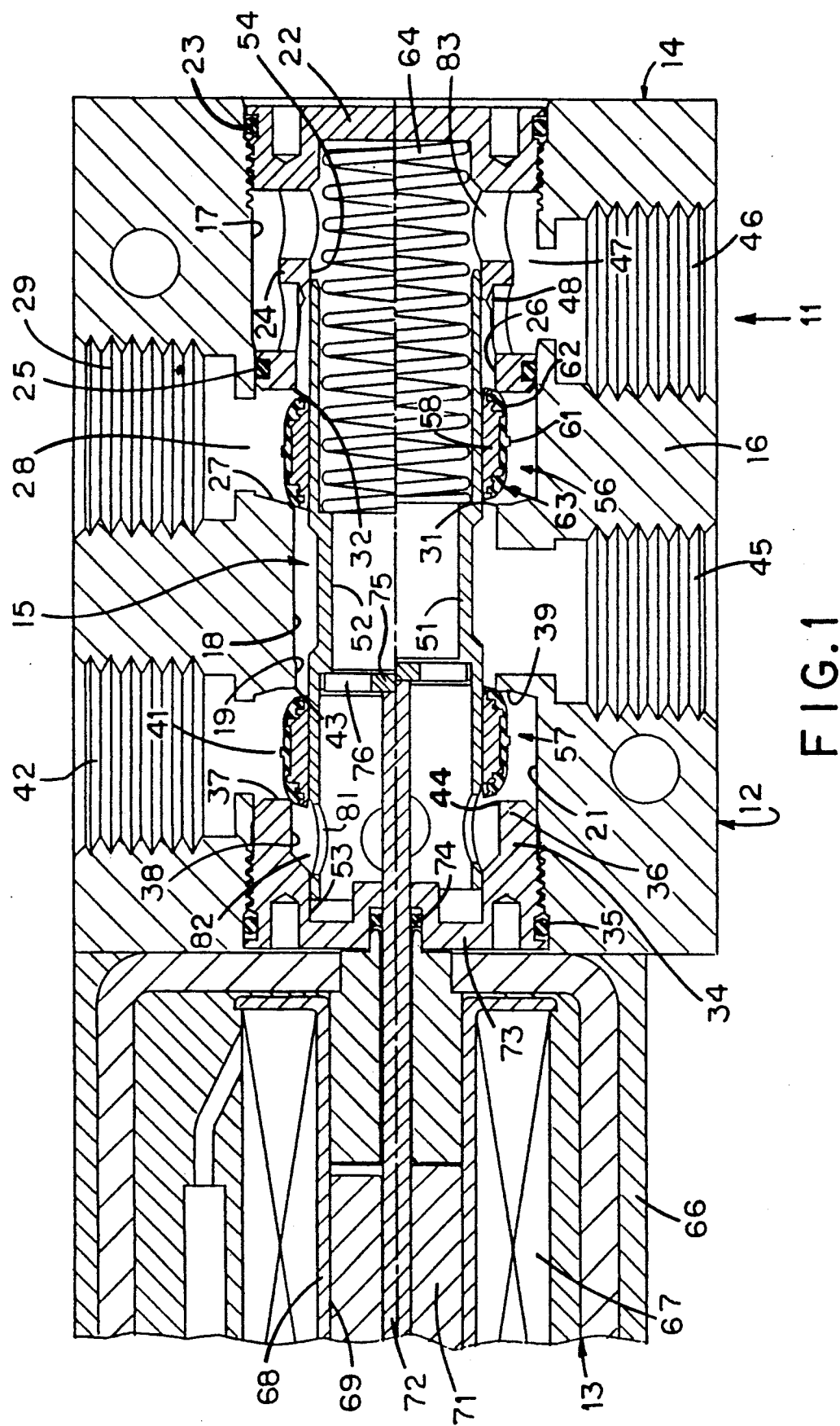
FIG. 1 is a central sectional view of a four-way valve unit incorporating the improved poppet construction of the present invention, which unit in the top half of FIG. 1 is illustrated in its normal unactivated position, and in the bottom half of FIG. 1 is illustrated in an activated position as actuated by a solenoid operator.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the valve unit and designated parts thereof. Said terminology will include the words specifically mentioned, derivatives thereof, and words of similar import.

DETAILED DESCRIPTION

FIG. 1 illustrates a valve unit 11 formed by a four-way valve assembly 12 connected to a solenoid operator 13. The valve assembly 12 includes a housing arrangement 14 having a single shiftable valve arrangement 15 coaxially slidably and sealingly disposed therein.

The housing arrangement 14 includes a monolithic one-piece integral valve body 16 having a stepped bore extending therethrough, which stepped bore includes a first bore 17 which extends inwardly from one end face of the valve body and joins to a further smaller-diameter bore 18 which is disposed generally in the middle of the valve body. This bore 18 in turn coaxially joins to a further bore 19 of slightly smaller diameter, which bore 19 in turn coaxially communicates with a further large-diameter bore 21 which opens outwardly through the other end face of the valve body. The outer ends of bores 17 and 21 are internally threaded.

Housing arrangement 14 also includes an end cap 22 which is threaded into and sealingly close off the outer end of the bore 17. A conventional elastomeric O-ring 23 externally surrounds the end cap and sealingly engages the wall of the bore 17. End cap 22 also has a cylindrical sleeve part 24 which projects coaxially inwardly thereof into the bore 17, which sleeve part adjacent the free end thereof mounts therearound a further elastomeric O-ring 25 which sealingly engages the wall of the bore 17. This sleeve part 24 has a cylindrical bore 26 opening outwardly through the axially inner end thereof, which bore 26 is coaxially aligned with and of substantially the same inside diameter as the bore 18.

The free end of the sleeve part 24 is spaced axially a predetermined distance from an annular shoulder 27 as defined on the housing at the inner face between the bores 17 and 18. This annular shoulder 27 and the axially opposed end face of the sleeve part 24 define therebetween an annular chamber 28 which in turn communicates with a port 29. This port 29 opens sidewardly through the housing and typically functions as a load port. Port 29, through its communication with the annular chamber 28, is adapted for selected communication with the aligned bores 17 and 26.

The annular shoulder 27, substantially at the diameter of the bore 18, defines thereon an annular valve seat 31, which valve seat faces generally axially toward a similar annular valve seat 32 as formed on the free end 37 of the sleeve part 24. This latter valve seat 32 is defined on the inner corner substantially at the diameter of the bore 18, whereby the axially opposed valve seats 31 and 32 are of substantially the same diameter.

Housing arrangement 14 also includes a further end cap 34 which is threaded into the outer end of the other end bore 21 and sealingly engages and closes off the outer end thereof, as through a conventional elastomeric O-ring 35. End cap 34 also has a cylindrical sleeve part 36 which project coaxially inwardly thereof into the bore 21. This sleeve part 36 has a cylindrical bore 38 opening outwardly through the axially inner end 37 thereof, which bore 38 is coaxially aligned with and of substantially the same inside diameter as the bore 19.

The free end 37 of sleeve part 36 is spaced axially a predetermined distance from an annular shoulder 39 as defined on the housing at the interface between the bores 19 and 21. This shoulder 39 and the axially opposed end face 37 on the inner free end of sleeve part 36 define therebetween an annular chamber 41 which in turn communicates with a port 42. This port 42 opens sidewardly through the housing and typically functions as a load port, and through its communication with the annular chamber 41 is adapted for selected communication with the aligned bores 19 and 38.

The annular shoulder 39, substantially at the diameter of the bore 19, defines thereon an annular valve seat 43, which valve seat faces generally axially toward a similar valve annular valve seat 44 as formed on the free end 37 of the sleeve part 36. This latter valve seat 44 is defined on the inner corner substantially at the diameter of the bore 38, whereby the axially opposed valve seats 43 and 44 are of substantially the same diameter.

The valve body 16 also has additional ports 45 and 46 formed therein for communication with the stepped bore at axially spaced locations therealong. The bore 45 is typically a supply or inlet port disposed for direct communication with the bore 18 at a location disposed axially between the annular chambers 28 and 41. The remaining port 46 is typically an exhaust port and is disposed for communication with the bore 17 at a location which is axially outwardly from the annular chamber 28. This latter port 46 communicates directly with an annular chamber 47 which is defined within bore 17 in surrounding relationship to the sleeve part 24, which chamber 47 is sealed at opposite axial ends by O-rings, but which is in continuous communication with the interior of bore 26 by ports or openings 48 formed radially through the sleeve part 24.

Considering now the shiftable valve arrangement 15, it includes a one-piece valve stem formed substantially by a hollow elongate cylindrical rod 51 having an opening or bore 52 extending generally coaxially therethrough. This cylindrical valve rod 51 is slidably supported at one end (the leftward end in FIG. 1) thereof within a blind cylindrical bore 53 formed in the end cap 34, which bore 53 is of smaller diameter than and is spaced axially outwardly from the cylindrical bore 38. The other (i.e., rightward end in FIG. 1) end of valve stem 51 is slidably supported within a further cylindrical bore 54 as defined in the other end cap 22, which bore 54 is of slightly smaller diameter and spaced axially outwardly from the cylindrical bore 26.

The valve arrangement 15 has a pair of axially-spaced poppet valves 56 and 57 stationarily mounted on the rod 51 in surrounding relationship thereto. The poppet valves 56 and 57 are disposed generally within the annular chambers 28 and 41, respectively, whereby the poppet valve 56 is hence disposed for cooperation between the opposed pair of valve seats 31-32, and the other poppet valve 57 is disposed for cooperation between the pair of opposed valve seats 43-44. The axial spacing between the poppets 56-57 corresponds to the spacing between the valve seats 31 and 44, which also corresponds to the axial spacing between the valve seats 32 and 43, so that each poppet is engaged with its respective valve seat when the shiftable valve arrangement is in either of the end positions illustrated by the upper and lower portions of FIG. 1.

Other than being of slightly different diameters so as to correspond to the slightly different diameters between the pairs of valve seats 31-32 and 43-44, which latter diameter differences are provided so as to provide a slight but very small unbalance which normally assists in holding the valve stem in the spring-urged position, the poppet valves 56 and 57 are otherwise structurally and functionally identical, and hence only poppet valve 56 will be described in detail below.

The poppet valve 56 includes a sleevelike support ring 58 which externally surrounds the valve rod 51 and is fixedly secured thereto, preferably by a press fit. This support ring 58, intermediate the opposite axial free ends thereof, is provided with an annular flange portion 59 which projects radially outwardly through a greater extent than the axial free end portions of the support ring 58. The support ring 58 in turn is externally surrounded by and fixedly secured to an integral one-piece poppet ring 61 of elastomeric or rubberlike material. This elastomeric poppet ring 61 totally surrounds and is fixedly secured to the support ring 58, preferably by being molded thereon. The poppet ring 61 has an outer diameter significantly greater than the diameter of the opposed pair of valve seats 31-32 with which it cooperates so that the poppet 61 projects radially outwardly through the annular gap defined between the opposed pair of valve seats 31-32. The poppet ring 61 defines thereon a pair of exterior and generally axially opposite facing seal faces 63 and 62 which are positioned so as to respectively sealingly engage the opposed valve seats 31 and 32. The construction of the elastomeric poppet 61, and specifically the seal faces 62-63, is explained in greater detail below.

The valve unit 11, in the illustrated embodiment, has the shiftable valve arrangement 15 spring-urged into one position, and for this purpose includes a spring 64 which has one end thereof seated against the end cap 22, and the other end seated against an internal shoulder defined on the valve rod 51 for normally urging the shiftable valve arrangement 15 into an end position wherein the poppets 56 and 57 respectively sealingly engage the valve seats 31 and 44. However, to shift the valve arrangement 15 into the other position so that the poppets 56 and 57 respectively engage the valve seats 32 and 43, then the solenoid operator 13 is appropriately energized. This operator 13 is of generally conventional construction and includes a housing 66 which is fixed relative to the valve body and mounts therein a solenoid winding 67 which surrounds an inner housing sleeve 68. This latter sleeve 68 defines therein a cylindrical bore 69 which is aligned with the valve body bore, and a solenoid plunger 71 is axially slidably supported within the bore 69. The solenoid plunger 71 has an elongate rod 72 fixed thereto and projecting outwardly thereof through an end plate 73 provided on the end cap 34. A suitable seal ring 74 slidably engages the plunger rod 72 where it projects through the end cap. The free end of plunger rod 72 abuts against a further end plate 75 which is fixedly secured inside the valve rod 51, which end plate has suitable openings 76 extending axially therethrough for permitting free flow through the hollow interior of the valve rod 51.

The valve rod 51 adjacent one end thereof has openings 81 projecting radially therethrough for communication with an annular chamber 82 which is disposed in surrounding relationship to the valve rod within the sleeve part 36, which chamber 82 is adapted for communication with the load port 42. Further openings 83 are formed radially through the sleeve part 24 of the end cap 22 so as to provide radial communication between the annular chamber 47 and the bore 54 defined at the end of the end cap, which latter bore 54 communicates directly with bore 52 which extends axially through the valve rod 51. This enables the bore 52 within valve rod 51 to be disposed in continuous communication with the exhaust port 46.

Figure 2:
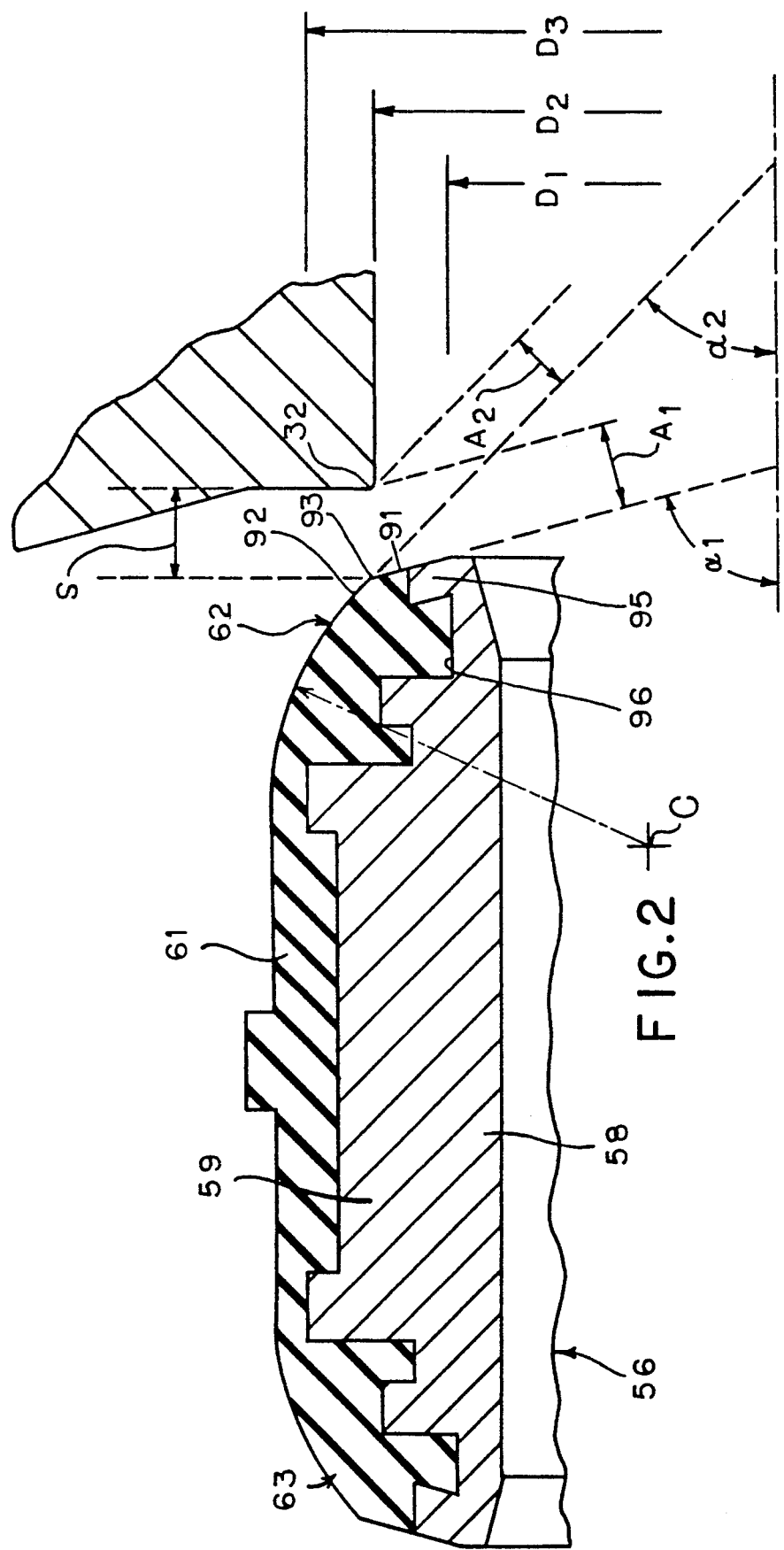
FIG. 2 is an enlarged fragmentary and diagrammatical view which illustrates the geometric configuration of the poppet and its cooperation with the valve seat.

Considering now the construction and configuration of the poppet valve 56, and referring specifically to FIG. 2, the poppet ring 61 has an overall axial length which substantially corresponds to the axial length of the support ring 58 so as to externally surround the support ring over the entire length thereof. The exterior or exposed configuration of the poppet ring 61 is such that it is of minimum exterior diameter adjacent the opposite free ends of the support ring 58, with the exterior diameter of the poppet ring 61 progressively increasing as the poppet ring projects axially inwardly toward a middle plane, with the maximum diameter of the poppet ring being substantially at the middle or central plane, that is the plane which is disposed axially midway between opposite axial free ends of the support ring.

However, the regions of the poppet ring 61 disposed adjacent the opposite axial ends thereof are of most significance since it is these regions which sealingly engage the valve seats. These regions, which define thereon the identical but oppositely directed valve faces 62 and 63, each includes and is defined by a pair of annular frusto-conical surfaces 91 and 92 which join together or intersect substantially at an annular peak 93. The frusto-conical surface 91 is typically referred to as the "inner" surface since it is of smaller diameter than the frusto-conical surfaces 92, the latter being referred to as the "outer" surface. That is, the inner surface 91 extends between a smaller diameter designated $D_1$ and a somewhat larger intermediate diameter designated $D_2$, the latter terminating substantially at the annular peak 93. The outer surface 92 in turn has an inner diameter which substantially corresponds to the diameter $D_2$, namely it starts at the peak 93, and then projects outwardly at least a limited extent so as to be defined by an outer but larger diameter defined generally by $D_3$. The intersection diameter or peak 93 substantially corresponds to the diameter which defines the valve seat, such as the valve seat 32 illustrated by FIG. 2.

The inner frusto-conical surface 91 is defined about an included angle $\alpha 1$, as measured relative to the axial centerline of the valve rod 51 (which is also the direction of valve shifting movement), which is substantially greater than the included angle $\alpha 2$ which measures the slope of the frusto-conical outer surface 92 relative to the same centerline. This results in the surfaces 91 and 92, at the point of intersection 93, defining a convex peak. In the preferred construction, the frusto-conical surface 91 preferably extends at a steep slope relative to the centerline, which slope $\alpha 1$ is about 75° in the illustrated embodiment, whereas the outer frusto-conical surface 92 extends at a significantly smaller slope $\alpha 2$, which in the illustrated embodiment is about 40°. The angular difference in the slopes $\alpha 1$ and $\alpha 2$ is preferably at least about 30°.

By providing the poppet ring 61 with a dual-slope sealing face 62 such that the dual slopes intersect and define a peak 93, and by providing this peak 93 with a diameter which substantially corresponds to the diameter of the valve seat, the valve seat contacts the sealing face 62 substantially at the peak 93 (or within a few thousandths of an inch thereof). This relationship permits maximum flow to occur between the valve poppet and valve seat by maximizing the flow area relative to valve stroke.

For example, and still referencing FIG. 2, when the valve stroke S results in the poppet being spaced from the valve seat in the opened position as illustrated, then the minimal flow area is the perpendicular distance designated $A_1$ between the valve seat and the inner conical surface 91, whereas if the poppet had been defined with only a single conical surface corresponding to the outer conical surface 92 substantially as extrapolated by the dotted line, then the minimal clearance distance and hence flow area between the valve seat and poppet would be the perpendicular distance designated $A_2$, which distance and hence flow area is significantly smaller than the distance and flow area defined by $A_1$. Thus, for the same stroke S, the double frusto-conical sealing face provides a significantly increased flow area and hence flow capacity in contrast to a poppet having a single frusto-conical face. Conversely, the present invention can provide the same flow area while utilizing a reduced stroke.

At the same time, however, the double frusto-conical seal face of the present invention still retains the advantageous sealing characteristics which are normally achieved using a lesser slope similar to the surface 92 since, by engaging the valve seat with the elastomeric ring in the vicinity of the peak 93, sufficient elastic material is present so as to achieve a very desirable sealing property, but at the same time the engagement of the valve seat substantially at the peak enables the elastomeric material in the vicinity of the peak to more readily resiliently deform so as to accommodate and create a very desirable fluid-tight sealing engagement with the valve seat.

As illustrated by FIG. 2, the support ring 58 has an annular radially outwardly projecting flange 95 at the free end thereof, which flange is angled or sloped axially inwardly as it projects radially outwardly. The flange 95 is separated from the center support flange 59 by an intermediate annular groove 96 which is of greater width at the base thereof. This flange 95 and cooperating groove 96 effectively create an interlock with the axial end portion of the elastomeric seal ring 61, and in effect define a significant mass of elastomeric material located in the vicinity of the peak 93 to facilitate a proper sealing engagement with the valve seat.

The operation of the four-way valve unit 11, incorporating therein the improved poppet construction of this invention, is believed apparent from the description given above. Further, such operational description substantially corresponds to the operational description described in detail in aforementioned U.S. Pat. No. 4,971,115, so that further detailed description of the operation is believed unnecessary.

Figure 3:
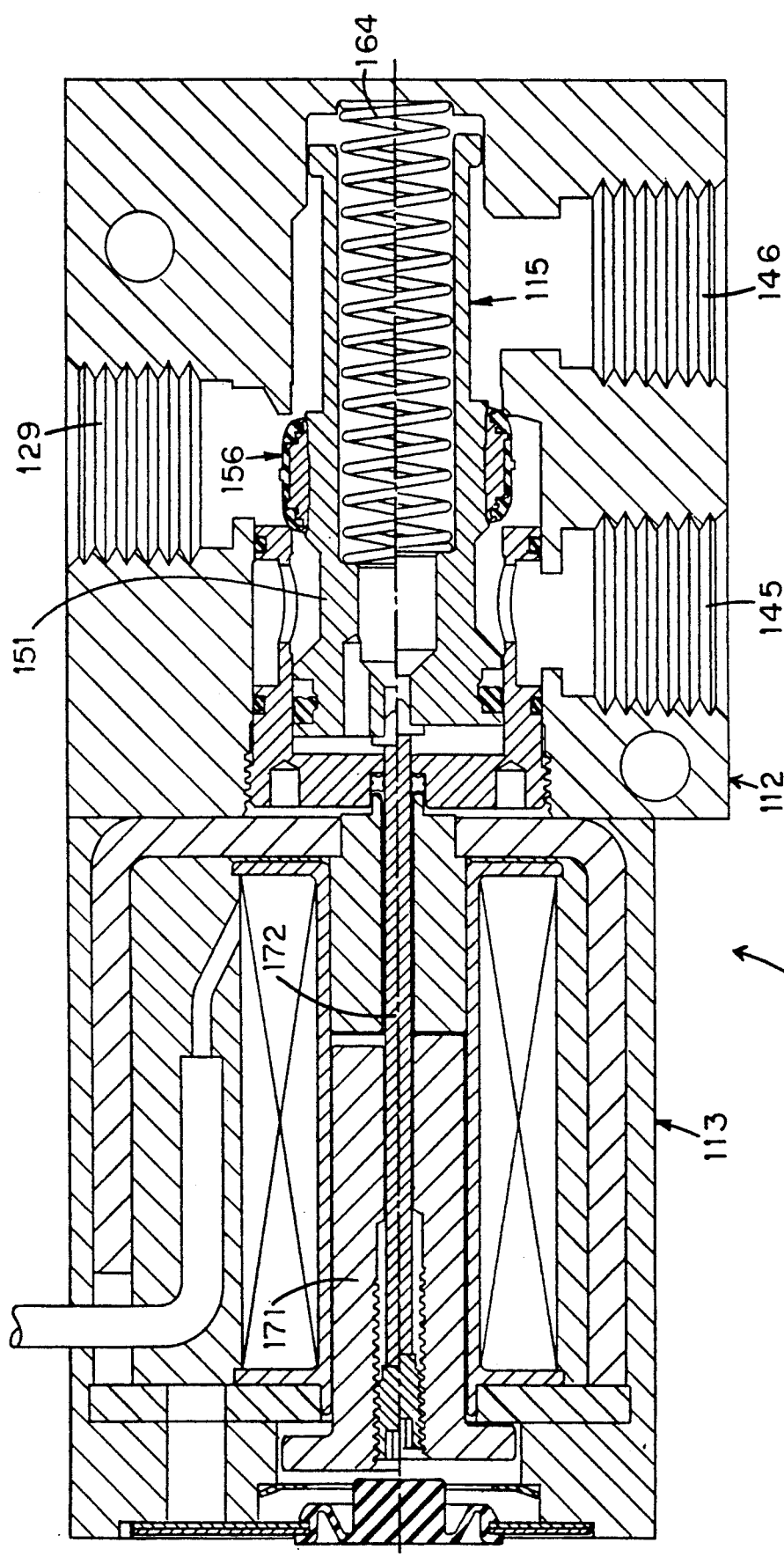
FIG. 3 is a central sectional view similar to FIG. 1 but illustrating a variation wherein the improved poppet is incorporated into a three-way valve unit.

Referencing now FIG. 3, there is illustrated another variation of the invention wherein the improved poppet construction is incorporated into a three-way valve assembly. Corresponding parts of the three-way valve assembly of FIG. 3 are designated by the same reference numerals utilized in FIG. 1 except for additional of "100" to the reference numeral. The improved poppet construction in the FIG. 3 embodiment is the same as the poppet construction associated with the four-way embodiment of FIG. 1. Again, the operation of this three-way valve unit of FIG. 3 is conventional, and reference is made to aforementioned U.S. Pat. No. 4,915,134 which describes the operation in detail.

As to the material from which the poppet ring 61 is constructed, same is preferably molded of an elastomer such as nitrile rubber and preferably has a shore A durometer in the range of about 60 to about 80. However, it will be apparent that other elastomeric materials having similar or equivalent properties can also be utilized.

While the poppet 61 as illustrated in FIG. 2 as having the outer frusto-conical surface 92 generated substantially by a straight line, it will be appreciated that this surface 92 could also be generated by a rather large radius, such as a radius generated about a center point C as illustrated by FIG. 2, since such large-radius generation of frusto-conical surface 92 still results in generation of two surfaces 91 and 92 which define a similar included angle therebetween substantially at the peak or intersection 93.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a poppet-type valve assembly having a housing provided with a bore therein, a valve stem movably supported within said bore, a plurality of ports formed in said housing and communicating with said bore at axially spaced locations, at least one of said ports communicating with said bore through an annular gap defined between first and second axially-spaced annular valve seats which are defined on said valve housing and concentrically encircle said bore, and said valve stem having a poppet-type valve member stationarily mounted therein in encircling relationship thereto, said poppet-type valve member projecting radially outwardly into said annular gap and being alternatively sealingly engageable with one or the other of said valve seats in response to shifting movement of said valve stem, said poppet-type valve member including an elastomeric poppet ring disposed in surrounding relationship to said valve stem and defining thereon a pair of axially spaced and axially oppositely facing sealing faces which are respectively engageable with said first and second valve seats, the improvement wherein said poppet ring comprises:

each said sealing face being defined by first and second annular frusto-conical surfaces which are disposed such that said first surface is positioned radially inwardly of said second surface, said first and second surfaces intersecting one another and defining at the intersection an annular convex peak which encircles the valve stem, said peak being of a diameter which substantially equals the diameter of the respectively adjacent valve seat so that the latter contacts the sealing face substantially at the peak, said first and second surfaces each being angularly sloped in the same direction relative to the direction of shifting movement of the valve stem, and said first surface being sloped at a significantly steeper angle than the slope of said second surface.

2. slope of said first surface extends at an angle which is at least about 30° greater than the slope of said second surface.

3. A valve assembly according to claim 2, wherein the scope of said first angle extends at an angle of about 75° and the slope of the second angle extends at a angle of about 40° relative to the longitudinal axis of the valve stem.

4. A valve assembly according to claim 1, wherein the poppet-type valve member includes a rigid axially-elongate support sleeve disposed in encircling relationship to and fixedly secured to said valve stem, said elastomeric poppet-ring being molded in one piece to and externally encircling said support sleeve, said support sleeve having a flange which projects radially outwardly thereof in axially spaced relationship from axial free ends of said support sleeve, said elastomeric ring being molded in one piece so as to entirely encircle said support sleeve throughout substantially the entire axial length thereof, said elastomeric ring being of maximum diameter substantially adjacent an axial midpoint of said support sleeve and of minimal diameter adjacent axial free ends of said support sleeve.

5. A valve assembly according to claim 4, wherein said support sleeve has radially outwardly projecting annular flanges adjacent the axial free ends thereof, said last-mentioned flanges being angled axially inwardly toward the axial mid-point of the support sleeve to create an interlocking engagement with the elastomeric poppet ring which is molded around the support sleeve.

6. A valve assembly according to claim 5, wherein each said valve seat is defined substantially at a corner between a cylindrical wall defined on said housing in surrounding relationship to said bore and a generally annular shoulder which projects radially outwardly therefrom.

7. A valve assembly according to claim 1, wherein said first frusto-conical surface projects radially outwardly from said support sleeve to a predetermined diameter which substantially defines the diameter of said peak, said second frusto-conical surface initiating at said predetermined diameter and projecting radially outwardly therebeyond, and said valve seat having a diameter which substantially corresponds to the diameter of said peak.

* * * * *

UNITED STATES PATENT AND TRADEMARK OFFICE
CERTIFICATE OF CORRECTION

PATENT NO. : 5 211 198
DATED : May 18, 1993
INVENTOR(S) : Thomas TINHOLT

It is certified that error appears in the above-identified patent and that said Letters Patent is hereby corrected as shown below:

Column 8, line 19; after "2." insert ---A valve assembly according to Claim 1, wherein the---.

Signed and Sealed this

First Day of February, 1994

*Attest:*

BRUCE LEHMAN

*Attesting Officer*  Commissioner of Patents and Trademarks